(12) United States Patent
Hoppe et al.

(10) Patent No.: US 9,977,180 B2
(45) Date of Patent: May 22, 2018

(54) PHOTONIC CRYSTAL FIBER, IN PARTICULAR SINGLE-MODE FIBER FOR THE IR WAVELENGTH RANGE, AND PROCESS FOR THE PRODUCTION THEREOF

(71) Applicant: SCHOTT AG, Mainz (DE)

(72) Inventors: Bernd Hoppe, Ingelheim (DE); Wolfgang Mannstadt, Münster-Sarmsheim (DE)

(73) Assignee: SCHOTT AG, Mainz (DE)

( * ) Notice: Subject to any disclaimer, the term of this patent is extended or adjusted under 35 U.S.C. 154(b) by 0 days. days.

(21) Appl. No.: 15/239,638

(22) Filed: Aug. 17, 2016

(65) Prior Publication Data

US 2017/0045682 A1    Feb. 16, 2017

Related U.S. Application Data

(63) Continuation of application No. PCT/EP2015/053089, filed on Feb. 13, 2015.

(51) Int. Cl.
*G02B 6/02* (2006.01)
*G02B 6/10* (2006.01)
*C03B 37/025* (2006.01)

(52) U.S. Cl.
CPC ...... *G02B 6/02328* (2013.01); *C03B 37/0256* (2013.01); *G02B 6/02347* (2013.01);
(Continued)

(58) Field of Classification Search
CPC .................................. G02B 6/02; G02B 6/025
(Continued)

(56) References Cited

U.S. PATENT DOCUMENTS 6,539,155 B1    3/2003   Broeng et al.
6,861,148 B2    3/2005   White
(Continued)

FOREIGN PATENT DOCUMENTS

CN    102981212    3/2013
DE    3704054      8/1988
(Continued)

OTHER PUBLICATIONS

International Search Report dated Apr. 29, 2015 from corresponding International PCT application No. PCT/EP2015/053089, 2 pages.
(Continued)

*Primary Examiner* — Kaveh C Kianni
(74) *Attorney, Agent, or Firm* — Ohlandt, Greeley, Ruggiero & Perle, L.L.P.

(57) ABSTRACT

The invention relates to a photonic crystal fiber, in particular single-mode fiber, for the transmission of electromagnetic radiation in the IR wavelength range of >1 µm, in particular in the wavelength range from 1 µm to 20 µm, preferably from 9 µm to 12 µm, having a light-conducting hollow core, in particular a hollow core having a diameter D, and a plurality of hollow bodies, in particular hollow tubes composed of a chalcogenide glass, arranged around the light-conducting hollow core. The hollow bodies (10, 20) are arranged in such a way that the diameter D of the light-conducting hollow core is greater than the shortest wavelength to be transmitted, preferably at least 20 µm, preferably at least 50 µm, particularly preferably at least 100 µm, preferably in the range from 100 µm to 500 µm, in particular in the range from 150 µm to 350 µm, and the damping for the transmission of electromagnetic radiation is <2 dB/m, in particular <1 dB/m, preferably <0.3 dB/m, in particular <0.1 dB/m.

18 Claims, 11 Drawing Sheets

(52) U.S. Cl.
CPC ..... *G02B 6/02361* (2013.01); *G02B 6/02371* (2013.01); *G02B 6/102* (2013.01)

(58) Field of Classification Search
USPC .......................................................... 385/125
See application file for complete search history.

(56) References Cited

U.S. PATENT DOCUMENTS

| | | | |
|---|---|---|---|
| 7,000,430 | B1 | 2/2006 | Fotheringham et al. |
| 7,136,559 | B2* | 11/2006 | Yusoff ..................... G02F 1/365 385/125 |
| 7,374,714 | B2 | 5/2008 | Buellesfeld |
| 2002/0122644 | A1 | 9/2002 | Birks et al. |
| 2004/0228592 | A1 | 11/2004 | Gaeta et al. |
| 2005/0025965 | A1* | 2/2005 | Sanghera ............ C03B 37/0122 428/364 |
| 2005/0065668 | A1* | 3/2005 | Sanghera ................ F41G 7/224 701/3 |
| 2005/0074215 | A1* | 4/2005 | Sanghera ............ C03B 37/0122 385/125 |
| 2005/0274149 | A1 | 12/2005 | Hoppe et al. |
| 2006/0153512 | A1 | 7/2006 | Falkenstein et al. |
| 2006/0210227 | A1* | 9/2006 | Shaw ................. G02B 6/02214 385/122 |
| 2006/0251369 | A1* | 11/2006 | Shaw ................. G02B 6/02347 385/125 |
| 2007/0014528 | A1* | 1/2007 | Busse .................... G02B 6/262 385/139 |
| 2008/0199135 | A1* | 8/2008 | Proulx ............... G02B 6/02347 385/123 |
| 2010/0303429 | A1* | 12/2010 | Gibson ............. C03B 37/02781 385/125 |
| 2011/0038587 | A1* | 2/2011 | Shaw .................... C03B 37/023 385/127 |
| 2012/0141079 | A1* | 6/2012 | Gibson ............... C03B 37/0122 385/125 |
| 2012/0141080 | A1* | 6/2012 | Gibson ............... C03B 37/0122 385/125 |
| 2012/0321263 | A1* | 12/2012 | Gibson ............... C03B 37/0122 385/125 |

FOREIGN PATENT DOCUMENTS

| | | |
|---|---|---|
| DE | 69827630 | 12/2005 |
| DE | 102011103686 | 12/2011 |
| FR | 2606866 | 5/1988 |
| WO | 0056674 | 9/2000 |

OTHER PUBLICATIONS

Pfänder, "Schott-Guide to Glass", Chapman & Hall, 1996, p. 21.
Russell, "Photonic-Crystal Fibers", J. Light Wave Technology, vol. 24, No. 12, Dec. 2006, pp. 4729-4749.
Russell, "Photonic Crystal Fibres", Science, Jan. 17, 2003, vol. 299, pp. 358-362.
Lexikon der Optik, pp. 213-214, with English translation, 2 pages.
English translation of International Preliminary Report on Patentability dated Aug. 18, 2016 from corresponding International Application No. PCT/EP2015/053089, 8 pages.

* cited by examiner

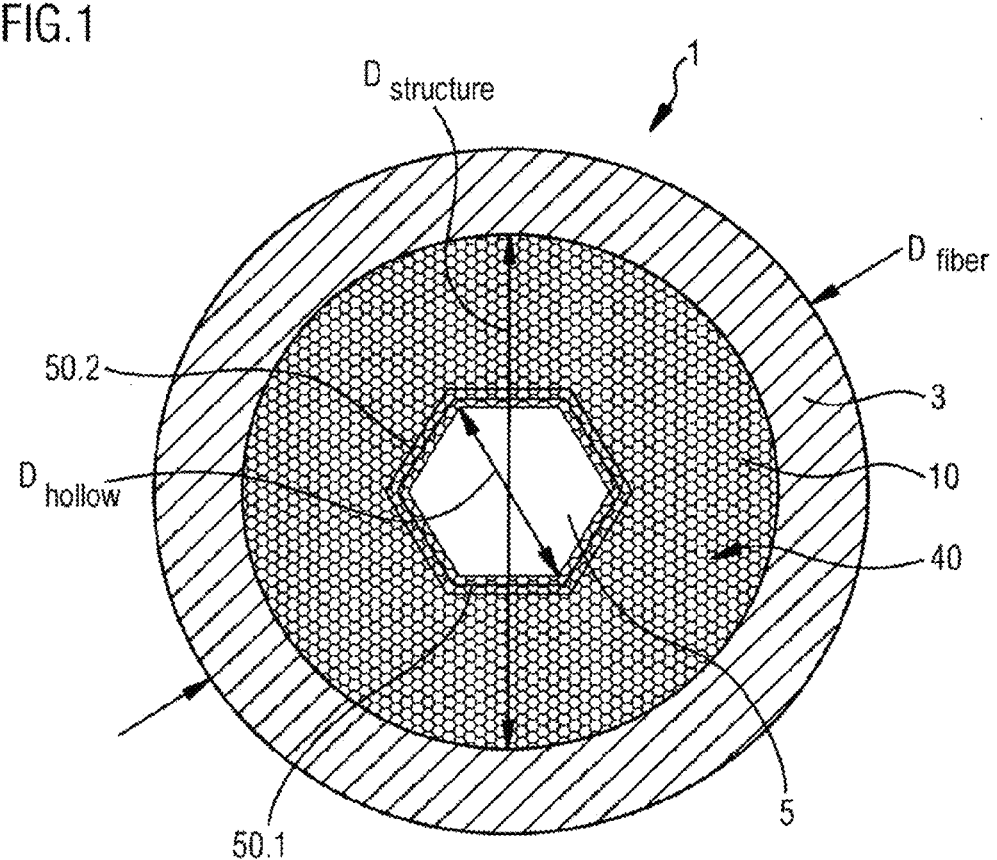

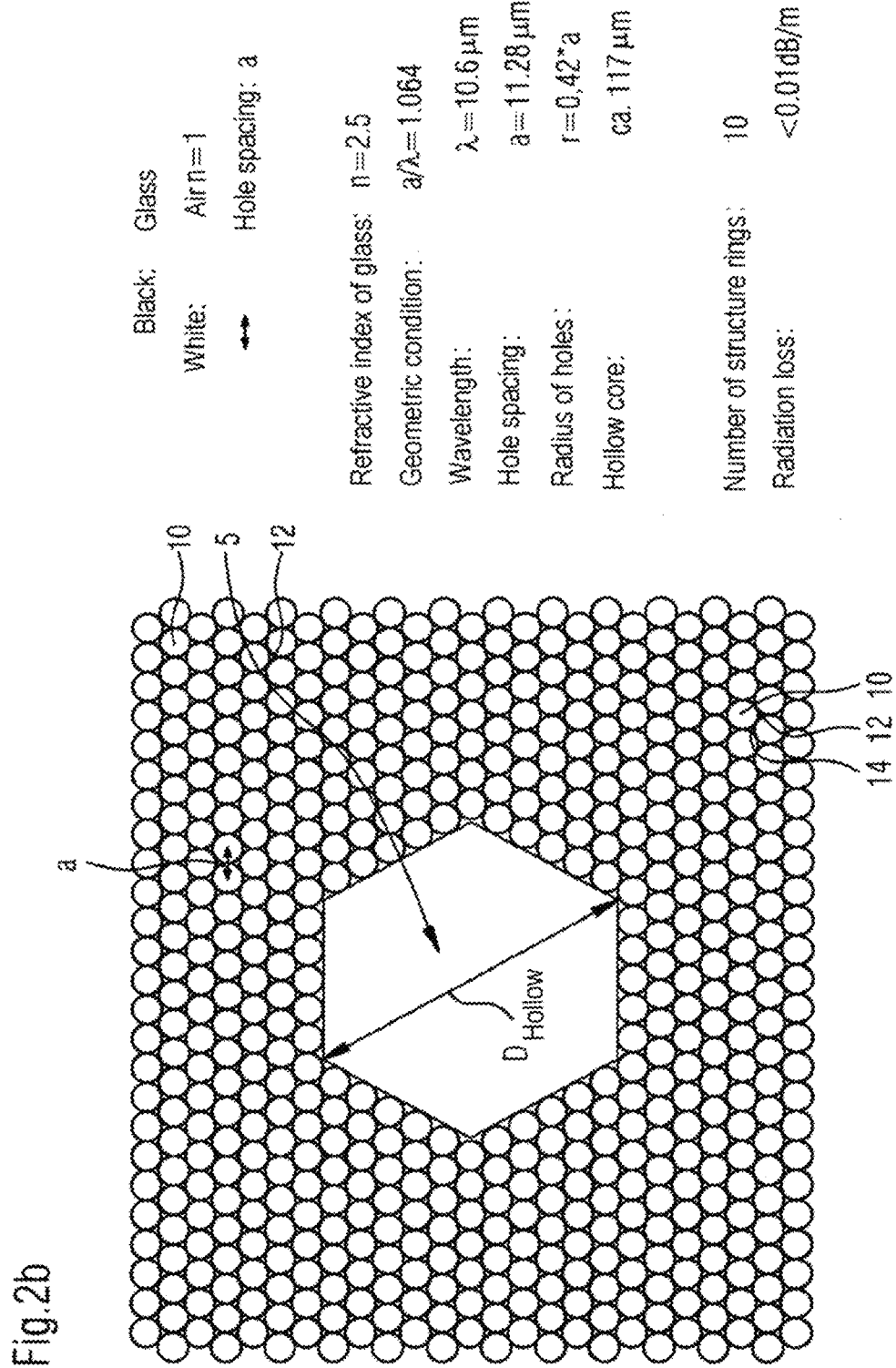

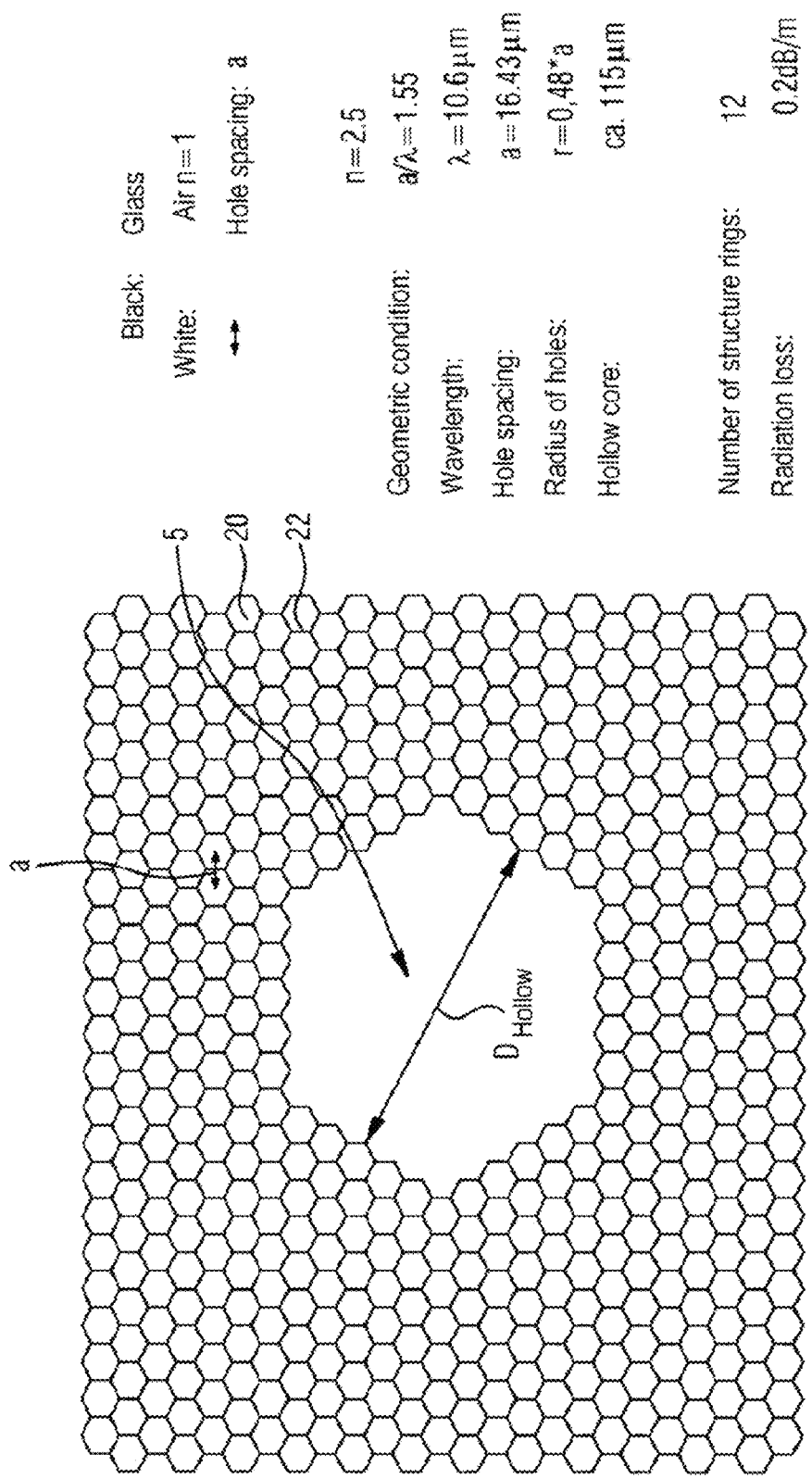

| Type | Holes | Tubes | Honeycomb | Trihexagonal pattern | Filled trihexagonal pattern |
|---|---|---|---|---|---|
| Refractive index n | 1.5 – 2.5 | 2.5 | 1.5 – 2.5 | 1.5 | 2.5 |
| Hollow core [μm] | 140 – 130 | 117 | 128 – 115 | 110 | 122 |
| Damping [dB/m] | 0.2 – 0.01 | 0.01 | 0.3 – 0.2 | 1.0 | 0.0 |

Structure types

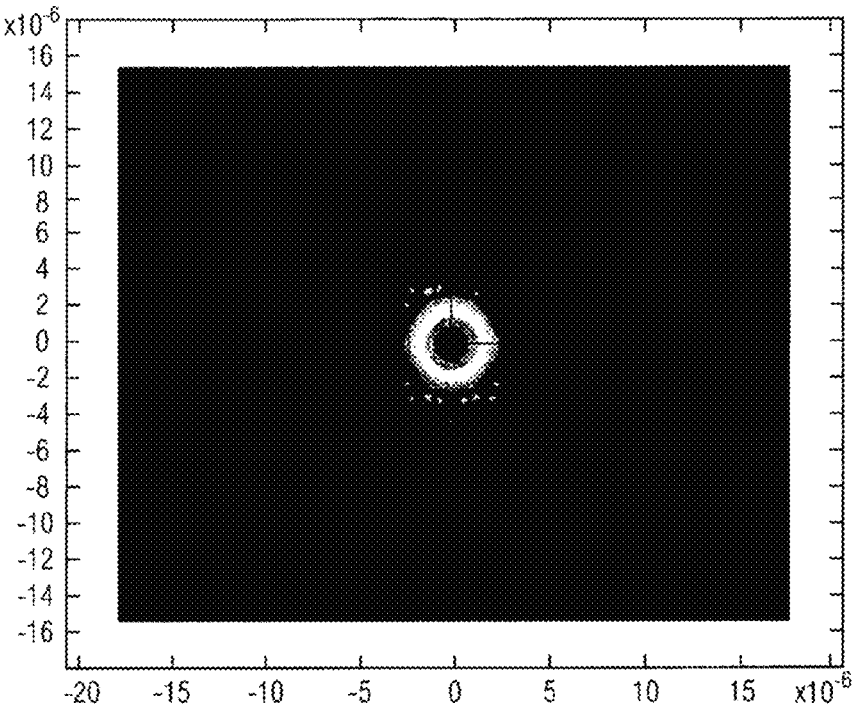
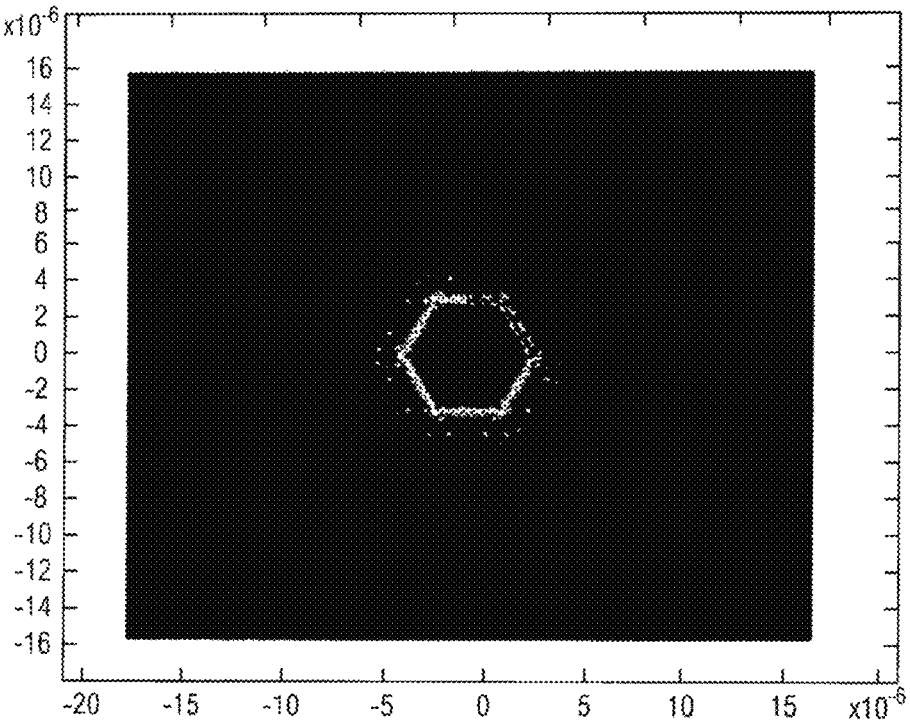

1ST DRAWING STEP

PHOTONIC CRYSTAL FIBER, IN PARTICULAR SINGLE-MODE FIBER FOR THE IR WAVELENGTH RANGE, AND PROCESS FOR THE PRODUCTION THEREOF

CROSS-REFERENCE TO RELATED APPLICATIONS

The present application is a continuation of International Application No. PCT/EP2015/053089, filed on Feb. 13, 2015, which in turn claims priority to German Patent Application No. 10 2014 001 995.0, which was filed on Feb. 2, 2014, each of which is incorporated herein by reference.

BACKGROUND OF THE DISCLOSURE

1. Summary of the Disclosure

The invention relates to a photonic crystal fiber, in particular single-mode fiber for the IR wavelength range, and a process for producing a microstructured fiber of this type in a drawing process.

2. Description of the Related Art

Glass fibers for conducting light, as have been described many times, for example in Lexikon der Optik, pages 213-214, usually comprise a combination of two materials having a different refractive index, a relatively highly refractive light-conducting core material which is sheathed in a material having a lower refractive index. In general, these are glass materials, with the glass material for the light-conducting core glass being different from the glass material of the sheathing glass having a lower refractive index. Such a structure enables light to be conducted along the axis of the fiber in the core by means of total reflection at the interface between core and sheath, without light exiting outward through the sheath. Such fibers are referred to as stepped index fibers.

In such a fiber, the core glass has to have a very high transparency for the desired wavelength of radiation to be conducted, so that the absorption losses in the fiber can be kept very low. For the transmission of $CO_2$ laser radiation, it is therefore necessary to use a material which has a very high transmission in the laser wavelength range from, for example, 9 µm to 12 µm. The only known class of materials which is transparent enough in the wavelength range mentioned is the chalcogenides. Core-sheath fibers can be produced therefrom but these have a relatively high absorption of 5 dB/m, i.e. only 30% of the input radiation reaches the fiber outlet after a distance of 1 m.

However, such fibers can only be subjected to extremely low laser powers of a few watts since they display very high absorption for higher powers, leading to strong heating and thus destruction of the fibers. These fibers are therefore unsuitable for industrial use.

As an alternative to the above-described fibers, fused silica tubes can, in order to achieve improved transmission of $CO_2$ laser radiation, be coated on the inside with silver in order to reflect the $CO_2$ laser radiation and thus achieve transmission of the radiation in this glass tube over a certain distance of from one meter to a number of meters. Typical absorptions are in the range above 1 dB/m. An alternative possibility is to coat the inside of glass tubes with up to 40 interference layers consisting alternately of a polymer and a chalcogenide glass. A reflectivity such that the $CO_2$ laser radiation is reflected at the inner wall and thus transmitted within such a fiber tube is achieved, for example, at a wavelength of 10 µm. Typical absorptions or dampings are in the range above 1 dB/m.

All these fiber tubes are not mode-maintaining, i.e. they are multimode fibers.

Both variants having a coated inner tube have the disadvantage that, due to the high absorption, only pulsed laser operation at a low laser power is possible since otherwise the fibers would heat up and be destroyed as a result of the absorption. Even at low powers, the life of such a fiber is only a few hours of operation. For this reason, such fibers are usually used only once, e.g. for medical applications in laser surgery. In addition, these fiber tubes have a very large internal and external diameter of up to 1 mm, which allows only a very large bending radius.

Another type of optical fibers are photonic crystal fibers, (PCF). In such glass fibers, the light is conducted not by means of the refractive index of different materials, for example different glasses, but by an effective refractive index difference within the material generated by means of a gas, in particular air. On the subject of such fibers, reference may be made, for example, to P. St. J. Russel, "Photonic Crystal Fibres", Science 299, 358 - 362 (2003) and also P. St. J. Russel "Photonic Crystal Fibres", J. Light Wave Technology, 24(12), 4729-4749 (2006), the disclosure content of which is fully incorporated by reference into the present patent application. The effective refractive index difference within the glass generated by means of gas, in particular air, is achieved by means of a hole structure arranged around the light-conducting core. The light-conducting core can be either a solid material or a gas, in particular air or a noble gas such as argon.

The effective refractive index difference in the PCF is achieved by means of a periodic hole structure arranged around the light-conducting core.

PCFs are usually made of fused silica. Here, suitable glass tubes are assembled to give a preform, with a tube in the middle being replaced by a rod of the same size which later forms the light-conducting core. Such a preform contains up to several hundred individual tubes and usually has a diameter of 50 mm. In a subsequent single-stage or multistage drawing process, the preform is drawn down to a 125 µm fiber, with the hole structure having to be made smaller to the same extent. As an alternative, the rod in the middle of the structure can be omitted when drawing the fiber, so that a hollow core fiber is formed. If the symmetry and accuracy of the microstructure in the fiber is good enough, this fiber, too, also conducts radiation as in a classical core-sheath fiber on the basis of the band gap effect, which will not be described in more detail here. Since no absorbing medium is present in the middle of these hollow core fibers, $CO_2$ laser radiation should in principle be able to be conducted thereby. However, conventional structured hollow core fibers composed of fused silica are no longer transparent above a wavelength of 5 µm and the $CO_2$ laser radiation has to interact with the microstructure within the hollow core in order to achieve the band gap effect. Since the $CO_2$ laser radiation is absorbed when it impinges on the fused silica, there is no occurrence of a band gap effect but instead the fiber is heated to destruction.

CN 10 298 1212 A has disclosed PCFs which are composed of tellurium glasses and are transparent in the wavelength range from 3 µm to 5 µm. The PCFs described in CN 10 298 1212 A are described as single-mode fibers but CN 10 298 1212 A gives no information as to the diameter of the hollow core and does not indicate any damping values. A process for drawing a thin fiber is also not indicated. Furthermore, no information as to the size of the fibers after the drawing process is given.

The production of photonic crystal fibers presents considerable problems since in a conventional drawing process, the preform of the fibers, in particular of the microstructured fibers, was very complicated because of the hollow spaces. At increasing temperature and relatively small structure sizes, the hollow spaces tend to collapse as a result of the surface tension.

The collapse of individual parts of the structure led to collapse of the total preform, so that the complete structure of the fibers collapsed in the most unfavorable case.

FR 2 606 866 has disclosed a process for producing fibers by means of a drawing process using two heating devices. In the process described in FR 2 606 866, heating is effected in two separate heating zones which are arranged in series. As materials which are heated by means of the device described in FR 2 606 866, mention is made of polymers, in particular PMMA.

The two-stage heating indicated in FR 2 606 866 prevents simultaneous heating of the outer part and the inner part of a preform. The resulting inhomogeneous heating when using the process and the apparatus described in FR 2 606 866 leads to collapse of the internal structure of the preform.

Further documents which relate to the production of glass fibers are U.S. Pat. No. 7,374,714 and US 2005/0274149, but with only one heating device.

DE 37 04 054 has disclosed a method of collapsing a glass tube. Since the glass tube firstly has to be collapsed, i.e. it must already be hot, before the $CO_2$ radiation can bring about any effect at all, the $CO_2$ laser radiation mentioned in DE 37 04 054 cannot be used for simultaneous heating by means of a plurality of heating devices.

Furthermore, in DE 37 04 054, the inner region of the glass tube is heated from the inside and by means of radiation (by means of $CO_2$ laser), which cannot pass through the glass from the outside, through the glass tube which is open at the top.

Further documents on the subject of glass fibers and the production of fibers are DE 698 27 630 and U.S. Pat. No. 6,861,148.

DE 10 2011 103 686 A1 has disclosed a process for producing microstructured fibers, i.e. PCFs, in which microstructured fibers, very particularly preferably photonic crystal fibers, can successfully be drawn. According to DE 10 2011 103 686 A1, the disclosure content of which is fully incorporated by reference into the present patent application, the fiber material is produced by means of a drawing process from a preform of the fibers, in particular the microstructured fibers, and is heated by means of at least one first heating device and at least one second heating device to a drawing temperature, where the first heating device is a heating device which provides a temperature which is above the softening temperature of the fiber material. Preference is given to temperatures at which the viscosity is in the range $\eta=10^4$ dPas to $10^{7.6}$ dPas. This results in the temperature preferably being from 10 K to 100 K above, in particular from 20 K to 60 K above, the softening temperature of the fiber material. The second heating device is, according to DE 10 2011 103 686 A1, an IR heating device as disclosed, for example, in WO 00/56674, the disclosure content of which is fully incorporated by reference into the present patent application, having a temperature of >1300 K, in particular >1500 K, in particular >2000 K, preferably >2500 K. First and second heating devices act essentially simultaneously or at the same time in a single heating zone. The preform of the fiber is then preferably heated from the outside in a single-stage heating operation.

The single-stage heating as per DE 10 2011 103 686 A1 in a heating zone having two heating devices achieves simultaneous heating of the outer and inner parts of the preform and prevents collapse of the internal structure.

The softening point of various fiber materials is defined at different viscosities, depending on the class of the fiber material. In general, the softening point is in the viscosity range from $\eta=10^4$ to $10^8$ dPas.

In the case of glass materials and glass-ceramic materials, the softening point $T_{EW}$ is the temperature at which the glass has a viscosity of $\eta=10^{7.6}$ dPas in the ambient atmosphere. In this respect, reference may be made to "Schott-Guide to Glass", by Heinz G. Pfänder, Chapman & Hall, 1996, page 21, in particular table 2.1, the disclosure content of which is fully incorporated by reference into the present patent application. As likewise shown in Heinz G. Pfänder "Schott-Guide to Glass", Chapman & Hall, 1996, page 21 in FIG. 2.3, the viscosity versus temperature curve is different for different types of glass. Thus, different softening points or softening temperatures $T_{EW}$ are obtained for different types of glass. An example in DE 10 2011 103 686 A1 of a glass having low softening temperatures is, for example, a heavy flint glass, e.g. the glass SF6 from SCHOTT AG, Mainz, having a softening temperature of $T_{EW}$=519° C. ($\eta=10^{7.6}$ dPas).

As a result of the use of two heating devices, the process described in DE 10 2011 103 686 A1 prevents uncontrolled changes in the hollow structure from occurring.

US 2005/0025965 A1 has disclosed an optical glass fiber having a hollow core composed of a chalcogenide glass. The glass fiber known from US 2005/0025965 A1 is a glass fiber having a photonic band gap. US 2005/0025965 A1 has not disclosed any arrangement of hollow bodies which leads to damping values of less than 2 dB/m, preferably less than 1 dB/m, in particular less than 0.3 dB/m. US 2005/0025965 A1 likewise does not disclose that the crystal fiber is a mode-containing crystal fiber.

US 2012/0141080 A1 likewise discloses a glass fiber having a photonic band gap (photonic gap) and a hollow core composed of a chalcogenide glass. As in US 2005/0025965 A1, US 2012/0141080 A1 does not say anything about arrangements of the hollow tubes which lead to low damping values or mode maintenance during transmission.

US 2008/0199135 A1 describes a glass fiber in which cladding, which can be made of a chalcogenide glass, surrounds a light-conducting core. The cladding itself has a plurality of holes which are arranged in hexagonal cells which in turn form an Archimedes lattice. As in the above-mentioned documents, there is no information as to the arrangement of the hollow tubes around the core, which leads to low damping values.

It is an object of the invention to overcome the disadvantages of the prior art and provide an optical fiber which allows transmission of electromagnetic radiation in the IR wavelength range with low losses. Furthermore, a process for producing such a fiber should be provided.

SUMMARY OF THE PRESENT DISCLOSURE

The object is achieved according to the invention by a photonic crystal fiber which is in particular designed as a single-mode fiber and allows the transmission of electromagnetic radiation in the IR wavelength range at wavelengths of >1 μm, in particular in the wavelength range from 1 µm to 14 µm, preferably from 9 µm to 12 µm, and has a light-conducting hollow core and a plurality of hollow bodies, in particular hollow tubes, composed of a glass material, in particular a chalcogenide glass, arranged around the light-conducting hollow core. According to the invention, the photonic crystal fiber is characterized in that the hollow bodies are arranged in such a way that the diameter D of the hollow core of the photonic crystal fiber is greater than the shortest wavelength to be transmitted, preferably at least 20 µm, preferably at least 50 µm, particularly preferably at least 100 µm, preferably in the range from 100 µm to 500 µm, in particular in the range from 150 µm to 350 µm, and the damping for the transmission of electromagnetic radiation is <2 dB/m, preferably <1 dB/m, preferably <0.3 dB/m, in particular <0.1 dB/m.

Photonic crystal fibers having such low damping values have not been disclosed by the prior art; in particular, the fibers and production methods presented in the prior art are not suitable for providing a low-damping, mode-maintaining fiber for the transmission range of wavelengths from 9 µm to 12 µm.

In a particularly advantageous embodiment of the invention, the individual hollow bodies arranged around the light-conducting hollow core are, in particular, hollow tubes composed of chalcogenide glass arranged in an annular manner in so-called structure rings around the hollow core.

The inventors have surprisingly found that a low damping of, for example, less than 2 dB/m is achieved only above a certain number of structure (hole) rings around the hollow core.

This was surprising because the prior art has suggested that a small number of structure rings, for example two and not more than three structure rings, around the hollow core is sufficient to maintain good guiding of the radiation. This assumption is based on the wavelength of the electromagnetic radiation to be conducted, which is in the region of 10 µm. Thus, structure sizes, i.e. holes around the hollow core, in the region of 10 µm in diameter are also necessary for producing a band gap effect. Since the radiation is to be conducted only in the hollow core, the radiation field must not "penetrate" too deeply into the hole structure in order not to be absorbed or emitted. A person skilled in the art will therefore assume that a structure width of more than one wavelength, i.e. at least two structure rings around the hollow core, should be sufficient to ensure guiding of the radiation.

The inventors have surprisingly found that a number of at least 6 structure rings can lead to damping of, for example, less than 2 dB/m. Damping of less than 1 dB/m has been achieved for 8 structure rings and damping of less than 0.5 dB/m has been achieved for 10 structure rings. This can be explained by an evanescent field of radiation which penetrates more deeply into a medium than can be explained by classical physical laws.

This can be attributed to the different conduction mechanism of the present fibers. In a manner analogous to the quantum-mechanical description of a doping atom in a semiconductor and the electronic structure thereof, the photons (light) are guided into the band gap by defect states/modes in the case of the fibers under consideration here.

A deviation in the perfect infinite photonic structure extended around the core, here the hole, leads to coupling of the defect mode field to its surroundings. This coupling depends extremely sensitively on the number of rings and a reduction by only one ring leads to a drastic increase in the losses.

Chalcogenide glasses are glasses in the network of which the glass-forming elements silicon and oxygen have been replaced by germanium, arsenic and the heavier chalcogens sulfur, selenium and tellurium. Due to the heavier elements and weaker chemical bonding, the light transparency of chalcogenide glasses shifts from the visible spectral range into the infrared spectral range. Chalcogenide glasses are generally semiconductors having a smaller mechanical strength and thermal resistance but a significantly greater thermal expansion than in the case of glasses for the visible spectral range.

The photonic crystal fiber indicated is characterized in that it firstly has, owing to the use of chalcogenide glasses, a high IR transmission and secondly, despite the very large diameter of the hollow core of at least 20 µm, preferably at least 50 µm, particularly preferably at least 100 µm, has very low damping which is preferably less than 2 dB/m, preferably 1 dB/m, preferably less than 0.3 dB/m, in particular less than 0.1 dB/m, in the IR wavelength range of >1 µm, preferably in the range from 1 to 14 µm, in particular from 9 to 12 µm. Surprisingly, a single-mode can be transmitted despite the hollow core of more than 100 µm. This was not foreseeable since single-mode fibers in the prior art have always been obtained only when the core diameter or the hollow core of the fiber was only insignificantly greater than or equal to the wavelength to be transmitted. If the core diameter was made significantly greater than the wavelength to be transmitted, for example twice as great, multimode transmission was automatically established. Despite a core diameter which is more than 10 times as great, the present fibers allow transmission in the single mode with damping values of <2 dB/m for IR radiation in the wavelength range from 1 µm to 14 µm, in particular from 9 µm to 12 µm.

The low damping values are surprisingly achieved particularly when the hollow tubes have a particular geometry. Thus, the inventors have surprisingly found that the hollow bodies have a circular or hexagonal cross section.

It has surprisingly been found that particularly low damping values of <2 dB/m, preferably <1 dB/m, in particular <0.3 dB/m, particularly preferably <0.1 dB/m, can be achieved when the hollow core does not have a round structure as in the prior art but instead has a polygonal cross section, in particular a hexagonal cross section. In the case of a hexagonal hollow core, damping values of 0.01 dB/m or less can be achieved. Very particular preference is given to combining hexagonal cross sections of the hollow core with hexagonal cross sections of the tubes. Losses of <0.01 dB/m can be achieved here.

Photonic crystal fibers which display low damping have one of the following configurations:
- the hollow bodies are configured as hollow tubes having a substantially round internal cross section and closed packing gaps,
- the hollow bodies are configured as hollow tubes having substantially round internal and external cross sections and open packing gaps,
- the hollow bodies are densely packed hexagonal hollow tubes and the hexagonal hollow tubes are joined via their flat sides or
- the hollow bodies are hexagonal hollow tubes having closed packing gaps.

Particular preference is given to the hollow bodies having a spacing a and the spacing a being >5 µm, in particular a >10 µm, preferably in the range from 5 to 50 µm, preferably in the range from 10 to 20 µm, at wavelengths to be transmitted in the range from 1 µm to 14 µm. These absolute values are derived from the discovery by the inventors that a geometric condition defined by the ratio of the spacing a to the wavelength X to be transmitted is advantageous for substantially loss-free transmission when:

$$a/\lambda \geq 1,$$

i.e. the spacing of the hollow fibers is, for example, 9 μm or greater at a wavelength to be transmitted of 9 μm.

Very particular preference is given to the hollow bodies having an internal diameter d=2 r and the diameter d being in the range from 0.98·a to 0.90·a, where a is the spacing of the hollow bodies, since the wall thickness of the tubes is as thin as possible so that the band gap effect is particularly pronounced.

Furthermore, the inventors have surprisingly found that the damping is dependent on the accuracy of the hole structure around the hollow core. This applies both to the spacing between two holes, which has here been denoted by a, and also to the diameter of the holes themselves. It is also important here that the geometry is adhered to, i.e. the holes are either perfectly round or are perfectly hexagonal, depending on how the structure is intended to look. Oval holes or deviations in the diameters of adjacent holes are to be avoided. Damping increases even at a deviation of the structural accuracy of more than 4%. In the case of round holes having a diameter of the holes of 10 μm, 4% would mean that the holes are allowed to be 9.6 μm or 10.4 μm. This also applies to all parameters (spacing, diameter, changes compared to adjacent holes). Above a deviation of 10%, the damping is so great that radiation can no longer be effectively transported through a fiber having a length of more than 50 cm. In the case of a change in the hole radius by <10%, for example 9.5%, a significant deviation from the spherical mode and a loss are discernible.

The inventors have also recognized that the conduction behavior in the fiber also depends on the refractive index of the material, in particular the glass material. When a structure which displays satisfactorily good conduction for a particular value of the refractive index n has been determined, it has been found that small deviations of only about 10% significantly increase the damping. Thus, it is, for example, not possible to apply a design of a PCF for a particular material having a refractive index of $n_1$ to a material having a refractive index of $n_2$. The damping is influenced by the combination of structure and glass type, i.e. the refractive index and the transmission of the bulk glass in the wavelength range which is of interest.

Particular preference is given to the fiber structure comprising a glass type having a refractive index n of 2.0-2.7, so that the fibers have a fundamental mode at a wavelength of 10 μm. Refractive indices n of <2 then lead to greater emission of the radiation in the structure, which leads to higher damping.

Particular preference is given to the photonic crystal fibers consisting of a chalcogenide glass which comprises at least one of the following elements:

| | |
|---|---|
| Germanium | (Ge) |
| Arsenic | (As) |
| Selenium | (Se) |
| Tellurium | (Te) |
| Antimony | (Sb) |

Particularly preferred chalcogenide glasses are chalcogenide infrared glasses from SCHOTT AG, Mainz. An example here is the glass IG2 from SCHOTT AG, Mainz, a $Ge_{33}$·$As_{12}$·$Se_{55}$ infrared-transparent chalcogenide glass for infrared radiation in the range from 3 to 5 μm and from 8 to 12 μm. An alternative is the glass IG3 from SCHOTT AG, Mainz, a $Ge_{30}$-$As_{13}$·$Se_{32}$·$Te_{25}$ glass or the glass IG4 from VITRON Spezialwerkstoffe GmbH, a $Ge_{10}$·$As_{40}$·$Se_{50}$ glass. Alternatively the glass IG5 from SCHOTT AG, Mainz, a $Ge_{28}$·$Sb_{12}$·$Se_{60}$ glass, or the glass IG6 from SCHOTT AG, Mainz, an $As_{40}$·$Se_{60}$ glass, is also a chalcogenide glass which can be used in the working example of the invention.

The fiber of the invention has for the first time made available a fiber having a hollow core of at least 20 μm, preferably at least 50 μm, particularly preferably at least 100 μm, in diameter for the transport of laser radiation in single-mode operation. Known structures from the prior art have hollow core sizes of less than 20 μm, which is not satisfactory for practical use. The invention has for the first time disclosed the combination of hollow core sizes of greater than 20 μm, preferably at least 50 μm, particularly preferably at least 100 μm, with single-mode transmission with at the same time low damping of <2 dB/m for a photonic crystal fiber. The invention is characterized by a combination of the materials class of chalcogenide glasses having a preferred refractive index n of >2 in the IR wavelength range and microstructured hollow core fibers, where the structure has a hollow core diameter of >20 μm, preferably at least 50 μm, particularly preferably at least 100 μm, and allows the transport of single-mode laser radiation with damping values of less than 2 dB/m. It has surprisingly been found that a limited selection of geometric microstructures is particularly suitable for this purpose.

Apart from air in the hollow core, other gases in the hollow core are also conceivable in order to protect the surrounding material against damage by thermal influences and reactions. The combination of highly refractive glasses with complex geometric microstructures and the highly precise manufacture of these structures has for the first time made it possible to transport single-mode laser radiation of >5 μm in a hollow core of >20 μm, preferably at least 50 μm, particularly preferably at least 100 μm, in diameter. It has surprisingly been found that the known geometries known from the literature, in which the structure of the fiber is formed by simple stacking of glass tubes and subsequent further drawing, have only limited suitability for such photonic crystal fibers.

Apart from the photonic crystal fiber, the invention also provides a process for producing such a photonic crystal fiber.

Thus, fibers of this type can be produced with sufficient precision only by means of specific drawing processes as described in DE 10 2011 103 686 A1. Very small deviations can lead to loss of the single mode or increase the low damping, which can ultimately lead to destruction of the fiber, as indicated above.

Cooling of the fiber from the outside (e.g. by means of water or gas flow) or internally (by means of gas flow in the structure or hollow core) can also be advantageous for functioning of the fiber.

If, contrary to DE 10 2011 103 686 A1, heat is supplied only by means of conventional electric heating, which can, for example, be the first heating device, to a preform from the outside inward by heat transfer from the hot furnace atmosphere to the surface of the preform, which represents a hollow body, and from there by heat conduction into the interior of the hollow structure, the hollow structure represents a particularly high thermal resistance and the temperature gradient increases greatly in this region of the preform. It is then necessary to heat the surface of the outer structure to above the actually required drawing temperature in order that the interior of the hollow structure reaches the drawing temperature. This leads to the temperature on the outer circumference of the structure increasing to such an extent that the hollow structures present there change their shape or even collapse due to the surface tension, which increases with increasing temperature and smaller structure sizes. As a consequence, the holes located further inside and adjacent holes likewise change shape since the thermal resistance decreases from the outside because of the holes which have changed in shape or already collapsed, and the heat input into the remaining structure thus increases. This domino effect is propagated until the complete structure form has been changed or collapsed. A stable drawing process is therefore not possible solely with heating of the preform by means of a single heating device, for example a first heating device designed as electric heating.

The sole use of a second heating device, which is based mainly on IR heating which locally emits infrared radiation, is also not possible. Although the infrared radiation can pass unhindered through the outside of the structure, multiple passage of the IR radiation through the hollow structure occurs as a result of multiple reflection at the individual surfaces of the hollow structure and brings about a locally increased proportion of absorbed IR radiation, leading to strong heating of the hollow structure compared to the outside of the structure. When the drawing temperature is reached in the outer region of the structure, the temperature is thus already increased significantly in the hollow structure, leading to a lower viscosity so that the structure changes its shape or collapses.

In the process employed for producing the photonic crystal fiber as described in DE 10 2011 103 686 A1, the two heating methods which have previously been described individually and in themselves in each case lead to uncontrolled or uninfluenceable change in shape or collapse of the structure, are now combined, namely conventional heating together with IR heating. This combination surprisingly leads to uncontrolled or uninfluenceable change in shape or collapse of the structure being able to be avoided even though the respective method taken alone cannot achieve this. The explanation as to why the process described in DE 10 2011 103 686 A1 makes it possible to heat hollow preforms as are used in the production of PCFs (photonic crystal fibers) without uncontrolled or uninfluenceable change in shape or collapse of the structure is that only the outer region of the structure, also referred to as sheathing tube, is heated by means of the conventional, i.e. first, heating device, while predominantly only the inner hollow structure is at the same time heated by means of the IR heating. It is then possible to set the temperatures of outer structure and inner structure virtually independently of one another. In particular, only that amount of heat energy which is necessary to bring the outer structure, in particular sheathing tube, to precisely the drawing temperature for a subsequent drawing process has to be introduced into the outside of the structure by means of the first heating device, i.e. the generally conventional heating elements. Additional energy input, which is relatively high due to the high thermal resistance of the hollow structure, through the sheathing tube so as to lead to heating of the internal structure does not have to be made available. Conversely, in the case of heating by means of infrared radiation, it is only necessary to transport or introduce that amount of energy into the inner structure as is necessary in the region of the inner structure to heat the latter to precisely the drawing temperature. A further positive effect of the process of the invention is that the outer structure and the hollow structure mutually influence one another and some heat transfer takes place. Together with the two heating methods, this leads to homogenization of the temperature over the entire cross section of the preform. The process of the invention advantageously allows the temperature level of the preform in the drawing process to be reduced since only that amount of energy which is locally required for the drawing temperature to be achieved precisely has to be introduced locally. This makes it possible for the drawing process to be carried out at the highest possible viscosity. The drawing temperature is preferably in a temperature range in which the viscosity of the fiber material is in the range $\eta=10^4$ to $10^8$ dPas. For glass materials, the viscosity is preferably in the range $\eta=10^4$ to $10^{7.6}$ dPas, i.e. the drawing temperature of the glass material is always above the temperature of the glass material at the softening point, i.e. above the softening temperature $T_{EW}$. Since the viscosity remains at a very high level when employing the process described in DE 10 2011 103 686 A1, the surface tension in the holes of the hollow structure can be kept low and a change in shape, in particular complete collapse, is prevented. To prevent the hollow structure becoming even slightly smaller during drawing as a result of the surface tension of the glass, it can be provided, in an advantageous embodiment of the invention, for such a phenomenon to be countered by application of an internal superatmospheric pressure to the holes of the hollow structure. Here, the magnitude of the pressure should be selected so that the absolute value of the surface tension is precisely compensated and the desired structure size is established. In particular, application of a superatmospheric pressure makes it possible to set the structures in a targeted manner.

In the process, heating from room temperature upward is preferably carried out simultaneously by means of both heating devices in a single joint heating zone and a homogeneous temperature field is thus produced. This avoids a geometric change in the internal microstructure, in contrast to a process as described in DE 37 04 054. In the process described in DE 37 04 054, the glass tube can be made to collapse by heating of the inner region of the glass tube from the inside by means of radiation ($CO_2$ laser) which cannot pass through the glass from the outside and enters through the glass tube which is open at the top.

The drawn glass material according to the invention is a chalcogenide glass, preferably the chalcogenide glass IG6 from SCHOTT AG, Mainz.

To obtain the preform from which the microstructured fibers can be drawn, a plurality of individual hollow tubes are assembled to give a preform having a diameter of, for example, 50 mm and a length of up to 1 m. Depending on whether fibers in which the core is light-conducting and produced from a solid material or, as an alternative, a hollow core is employed for light conduction, either the tube is replaced, precisely in the middle of the preform, by a rod of the same diameter which later forms the light-conducting core or centrally located inner tubes, for example seven tubes, are removed so as to form a hollow core which later forms the light-conducting part before fiber drawing. The body which has been assembled in this way is subsequently drawn down in a first drawing step, for example by means of a fiber drawing tower, with conventional electric heating. This then gives the preform which is used in the drawing process of the invention for drawing the microstructured fibers.

It is also possible, after taking out the tubes, to stabilize the hollow core by insertion of a support tube which is thin-walled and is in contact with the interior of the hollow core in a further-developed embodiment. If the tube is thin-walled, it has no influence on the band gap effect and does not interfere with the latter.

Depending on the material, the glass temperature necessary for drawing can be at different temperatures. The glass temperature necessary for drawing the preform on which the further drawing process is based from the mold is, depending on the diameter of the fibers to be drawn, in the range from 10 K to 100 K above, in particular from 20 K to 60 K above, the softening point at a viscosity of $10^{7.6}$ dPas. In this first drawing step, it is thus possible to use a conventional electric heating apparatus. As a result of the first drawing step, the individual tubes stick together at the surface along the axis of the mold, so that a solid rod having a hole structure is formed. The structure of the individual tubes in the structured rod is reduced to scale. However, the hole diameters achieved in the first drawing step are still so large that collapse as a result of surface tensions does not occur.

According to the invention, a second drawing process using two heating devices is carried out in order to obtain the final fibers with the desired hole size. Here, it has to be ensured that an appropriate drawing ratio, i.e. a ratio of preform diameter to fiber diameter, is set.

Such a diameter is preferably achieved by the rod obtained in the first drawing step being enveloped with a thick-walled sheathing tube of the same material.

The temperature at which the second drawing process is carried out according to the invention using two heating apparatuses is in the range from 10 K to 100 K above, in particular from 10 K to 80 K above, in particular from 20 K to 60 K above, the softening point, i.e. the softening point $T_{EW}$ of the fiber material to be drawn, in particular glass material.

To determine the temperature in the drawing process, it is advantageous to use a temperature measuring device. A pyrometer is preferably used as temperature measuring device. A pyrometer makes it possible to measure and evaluate the heat radiation emitted from a body. Since the intensity of the heat radiation depends on the temperature, it is possible to determine the temperature by means of the pyrometer.

To determine the temperature in the interior of the preform by means of the pyrometer, preference is given to using a pyrometer as a function of the type of material, in particular, for example, the type of glass, in the case of which the material or the glass is transparent to the radiation employed by the pyrometer up to the place at which measurement takes place.

Preference is given to the temperatures determined by means of the temperature measuring device, in particular the pyrometer, being employed to influence, in particular to regulate, the heating power of the heating devices. A conclusion in respect of the extent to which the preform has been heated up can be made on the basis of the pyrometer measurement and the heating device can accordingly be controlled in such a way that the desired target temperature is reached.

The above-described process makes it possible to produce a photonic crystal fiber having an arrangement of the hollow bodies in a structure having a spacing a of the hollow bodies and/or a cross section of the hollow bodies. The process is characterized in that the spacing a and/or the cross section of the hollow bodies deviates by less than 10%, preferably less than 4%, in particular less than 1%, for different hollow bodies.

Apart from production of a microstructured fiber having a single light-conducting core, it is also possible for a preform to comprise a plurality of cores, so that a multicore-microstructured fiber can be drawn from such a preform.

To strengthen the fiber, coating of the fiber, for example with a polymer layer, can be carried out immediately after the drawing process of the invention.

The use of UV-curable acrylate as coating material is particularly preferred here.

Apart from the photonic crystal fiber and the process for producing the latter, the invention also provides a laser device having such a crystal fiber.

DESCRIPTION OF THE FIGURES

The invention is illustrated below with the aid of the working examples. The figures show:

FIG. 1 is a cross sectional view of a photonic crystal fiber according to the invention.

FIGS. 2a-2e are cross sectional views of different embodiments of photonic crystal fibers of the present disclosure.

FIG. 3f-3j show plots of modes in the fiber for different geometries and/or refractive indices.

Figure 2A:
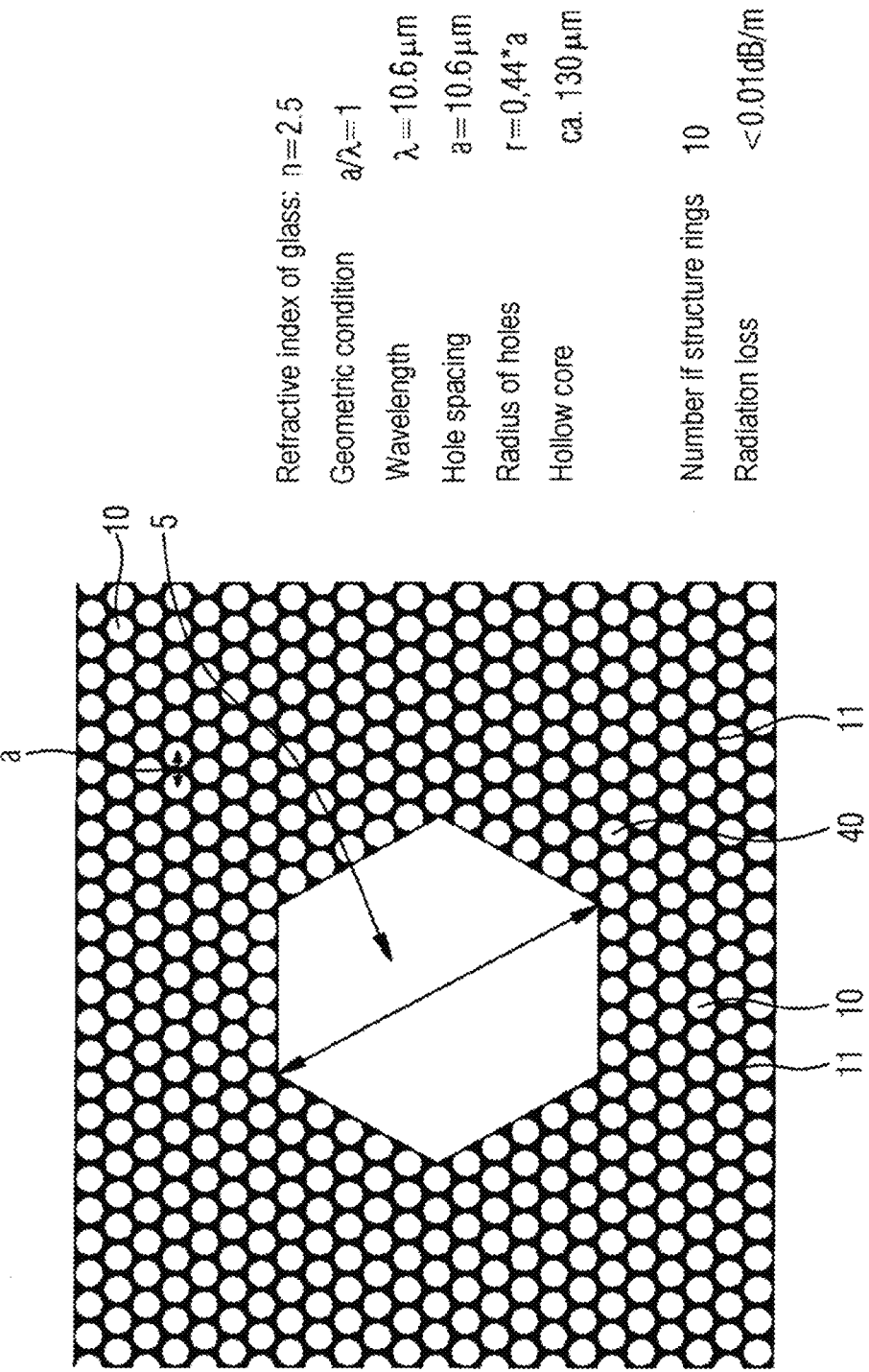

The figures are schematic sketches from which the precise sizes both of the hollow core and of the individual hollow tubes surrounding the hollow core cannot be deduced.

DETAILED DESCRIPTION OF THE DISCLOSURE

Referring to the Figures, and in particular FIG. 1, the cross section through a hollow core fiber according to the invention as photonic crystal fiber is shown. The complete fiber is denoted by 1.

The fiber after the double drawing process has a sheathing tube 3. The sheathing tube 3 is generally applied to the preform after the first drawing process and serves to stabilize the fiber during the second drawing process at a drawing ratio of, for example, 200. The sheathing tube is also referred to as cladding. The external fiber diameter $D_{fiber}$ of the total fiber determined by the sheathing tube is from 450 μm to 1000 μm.

In the first drawing step, a plurality of individual tubes or pipes 10 which, in the embodiment depicted, have a round cross section are assembled, but the invention is not restricted thereto. The cross section of the individual tubes 10 could also be hexagonal, as shown in FIGS. 2c to 2e. The plurality of the individual tubes 10 forms a structure 40 which is surrounded by the sheathing tube 3.

The diameter of the structure 40, consisting of a plurality of individual hollow tubes 10, is 350 μm in the present working example. The diameter of the structure 40 is denoted by $D_{structure}$.

In the middle of the structure 40 assembled from individual tubes 10 there is a hollow core 5 which, in contrast to the structure 40, likewise has a hexagonal contour and a diameter $D_{hollow}$ of 130 μm in the final fiber after the second drawing process. The hexagonal external contour of the hollow core 5 is responsible for the very good damping behavior of the fiber 1 depicted. The damping of the fiber is in the range from 0.2 to 0.01 dB/m. The refractive index of the glass, which in the present case is a chalcogenide glass, for example the glass IG 6 from SCHOTT AG, is approximately n=2.5 in the IR wavelength range indicated.

Also shown by way of example in FIG. 1 are two of the plurality of structure rings which are arranged around the hollow core, namely the first structure ring 50.1 and the second structure ring 50.2. Further structure rings such as the third structure ring are not shown but follow in the same way. The shape of the structure rings 50.1, 50.2 is that of a hexagon in the present embodiment, without being restricted thereto. The inventors have recognized that the damping is critically influenced by the number of structure rings. Thus, for example, 6 structure rings can lead to damping values below 2 dB/m, 8 structure rings can lead to damping values below 1 dB/m and 10 structure rings can lead to damping values below 0.5 dB/m.

The two-stage drawing process makes it possible to draw a structure in a first drawing process in a structured rod of smaller diameter which is provided with cladding or a sheathing tube and is subsequently drawn in a second drawing process, for example in a down-draw process as described below, to give the final fiber, as depicted in FIG. 1, where the total diameter $D_{fiber}$ of the photonic fiber embedded in the sheathing tube 3 is in the range from 450 µm to 1000 µm.

Apart from a down-draw process, it would also be possible to draw the fiber in two stages in an up-draw process, which is particularly advantageous in the case of large preforms having a high weight utilizing natural or forced convection countered by a force of gravity.

FIGS. 2*a*-2*e* show photonic crystal fibers having a different hollow core 5 for various structure types of the tubes 10.

Figure 2D:
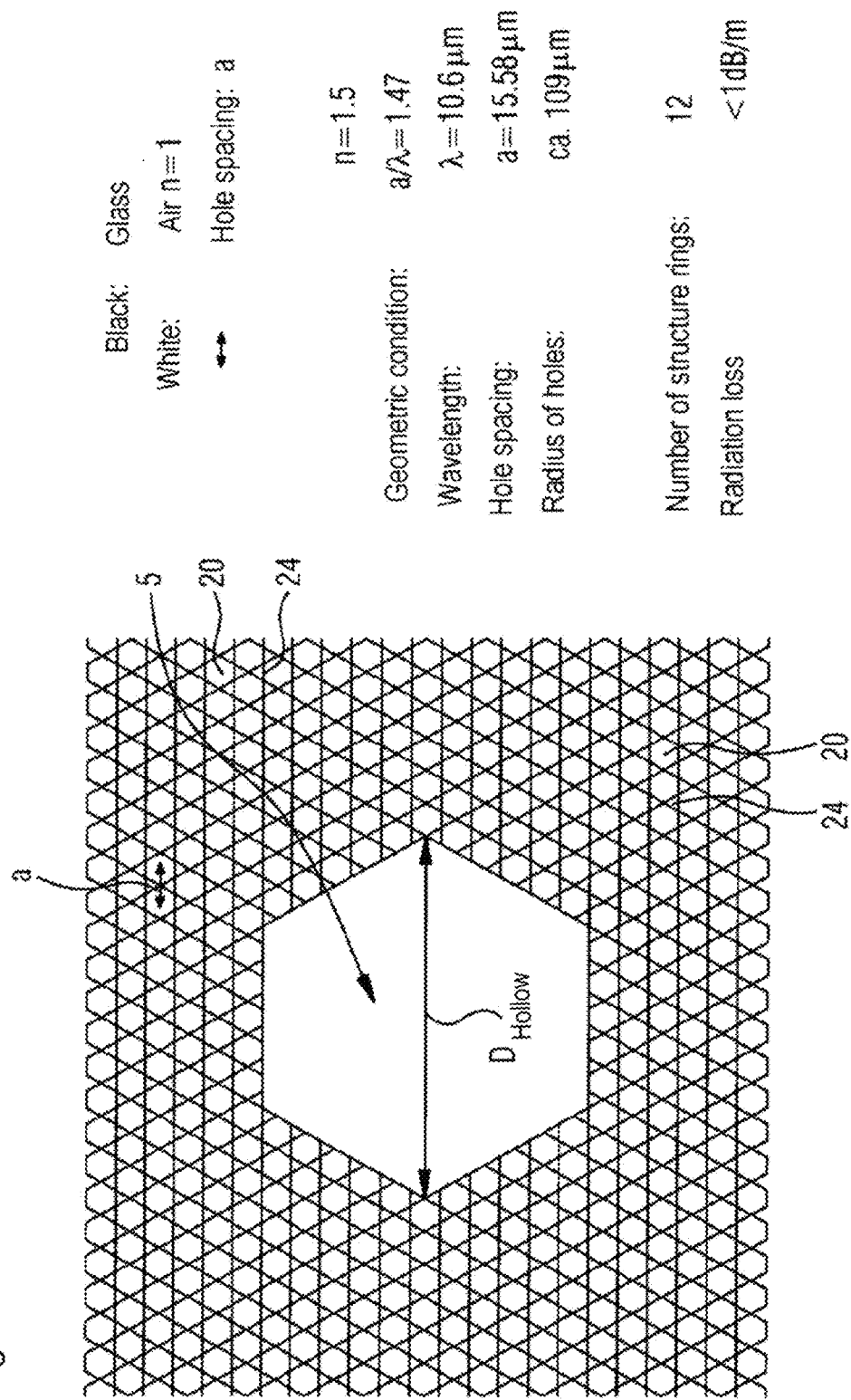
Figure 2E:
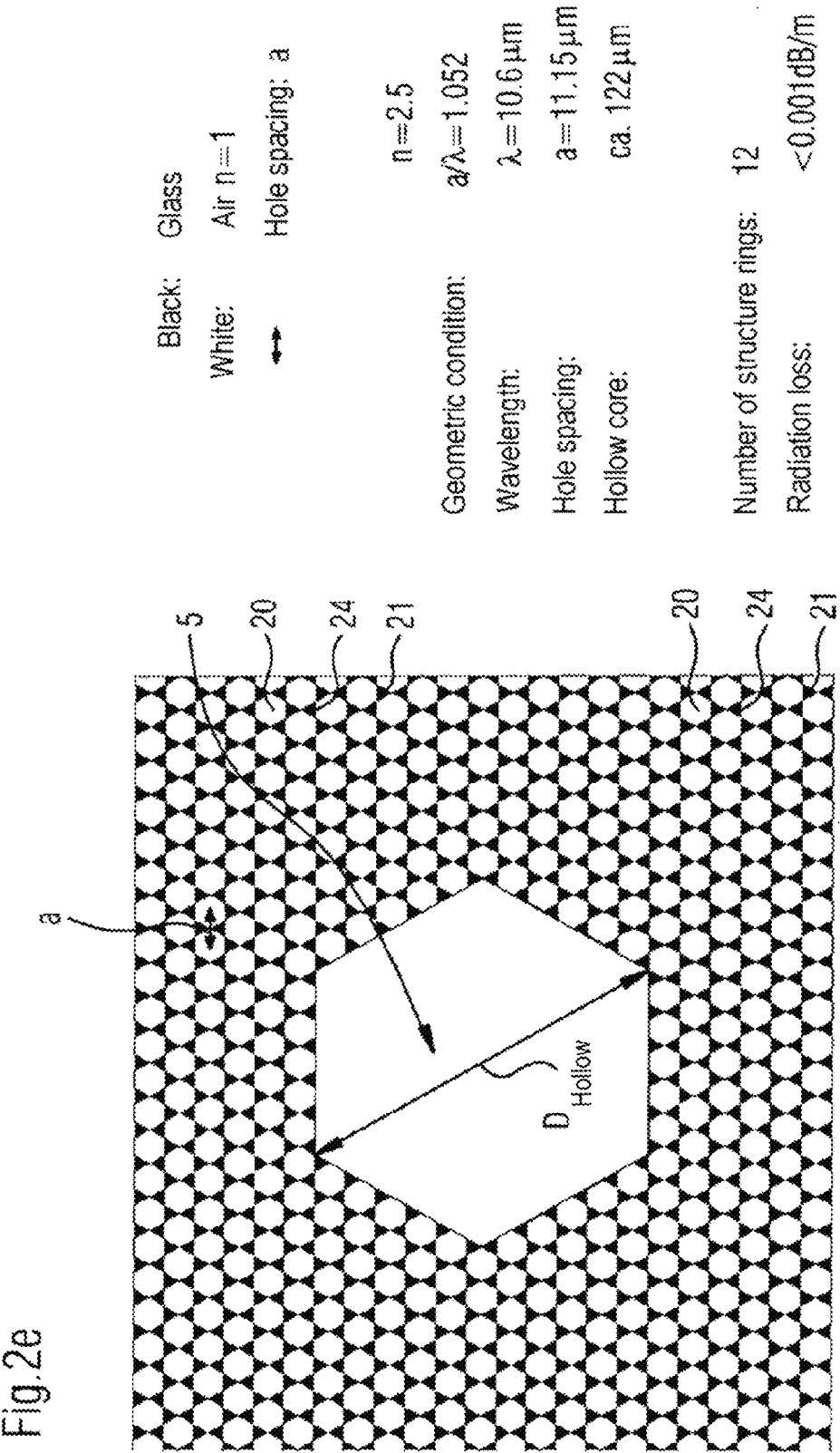

In FIG. 2*a*, the hexagonal external shape of the hollow core 5, where the diameter $D_{hollow}$ is 130 µm, can clearly be seen.

The refractive index n of the glass material of the individual tubes 10 is approximately n=2.5. The glass material between the individual tubes 10 is denoted by 11. The refractive index of the hollow space 5 is n=1 when air is used. However, it is also possible to use other gases in the hollow core 5.

The spacing a between the individual glass tubes or holes of the structure 40 is a =10 µm, and the radius of the individual holes is 0.44 a. At a wavelength λ of 10.6 µm and a spacing a of the individual holes of 10.6 µm, a value of approximately 1 for the geometric condition follows. The configuration depicted in FIG. 2*a* provides, owing to the essentially hexagonal external shape of the hollow core 5 with a diameter $D_{hollow}$ of 130 µm, a photonic crystal fiber having damping of <0.01 dB/m. The space between the individual hollow tubes is filled with glass material 11.

FIG. 2*b* shows an alternative configuration of structuring compared to FIG. 2*a*. The cross section of the individual hollow tubes 10 is again round, but the intermediate space 14 between the individual hollow tubes is not filled with a glass material but instead the glass material having a refractive index of n=2.5 forms only the outer wall 12 of the hollow tube 10. Once again, the hollow spaces 10 are assembled in such a way that a hollow core 5 having essentially hexagonal external dimensions is provided. The diameter $D_{hollow}$ of the hollow core 5 of the structure 40 depicted in FIG. 2*b* is about 117 µm. The spacing a between the individual hollow tubes 10 is 11.28 µm, which corresponds to a geometric factor of a/λ=1.064 at a wavelength of the light of λ=10.6 µm. In contrast to the embodiment in FIG. 2*a*, the intermediate space 14 between the hollow tubes 10 in FIG. 2*b* is not filled with a glass material and the glass material is merely provided by the wall n of the hollow tubes. The refractive index of the glass material is, as in the working example shown in FIG. 2*a*, about n=2.5. The damping of the structure in FIG. 2*b* is about 0.01 dB/m. Significantly better damping values are achieved by filling with a glass material between the individual hollow tubes 100, as in FIG. 2*a*.

FIG. 2*c* shows a further variant of the invention. In the embodiment shown in FIG. 2*c*, the structure is achieved by nesting of hollow tubes 20 having a hexagonal cross section. The hollow core 5 then does not have a round shape; in the present case the contour is hexagonal with edges.

The refractive index of the outer walls 22 of the substantially hexagonal hollow tubes is, as above, n=2.5, and the spacing between the individual hollow tubes having a hexagonal cross section is a=16.43 µm. At a wavelength of λ=10.6 µm, the geometric condition a/λ=1.55. The diameter of the hexagonal honeycomb is 0.48×a, and the diameter of the hollow core 5 $D_{hollow}$ is about 115 µm. Owing to the very irregular shape of the hollow core 5, the damping loss of a structure as shown in FIG. 2*c* is relatively high at about 0.2 dB/m.

High damping is likewise displayed by structures as shown in FIG. 2*d*, in the case of which the individual hollow tubes 20 again have a hexagonal cross section but the hollow tubes do not adjoin one another directly but instead there is no glass material in the intermediate space 24 between the individual hollow tubes 20 having a hexagonal cross section, analogous to the configuration shown in FIG. 2*b*. The refractive index of the material in FIG. 2*d* is n=2.5. The diameter of the hollow core 5 having a substantially hexagonal external diameter $D_{hollow}$ is about 109 µm. The spacing a between the individual structural elements is 15.58 µm, which corresponds to a geometric condition a/λ=1.47 at a wavelength λ=10.6 µm. Damping of <1 dB/m is measured for the structure depicted in FIG. 2*d*.

FIG. 2*e* shows a structure which differs from that in FIG. 2*d* in that the intermediate spaces 24 between the individual hollow tubes 20 having a substantially hexagonal cross section are filled with glass material 21. Once again, the hollow tubes 20 have a hexagonal cross section, but the hollow spaces 24 are, as in the configuration shown in FIG. 2*a*, filled with glass material 21. The hollow core 5 once again has a substantially hexagonal shape and the diameter $D_{hollow}$ of the hollow space is about 122 µm. The refractive index of the glass material 21 introduced between the substantially hexagonal hollow tube is n=2.5. The hole spacing a between the individual hollow tubes having a hexagonal cross section is 11.15 µm, giving a geometric condition a/λ=1.052 at a wavelength λ=10.6 µm. The configuration of the geometry of the cross sections of the individual hollow tubes with six edges and filled intermediate spaces 24 as shown in FIG. 2*e* and also a hexagonal interior hollow space 5 which is filled with gas gives by far the lowest losses which are less than 0.001 dB/m. Such low losses are surprising and not foreseeable for a person skilled in the art, in particular in combination with single-mode transmission of electromagnetic waves in the IR wavelength range from 9 to 12 µm.

The different structure types shown in FIGS. 2*a* to 2*e* are also summarized in table form in FIGS. 3*a* to 3*e*, where the different structure type and also the diameter of the hollow cores, the refractive index and the damping are described.

Figures 3A, 3B, 3C, 3D, 3E:
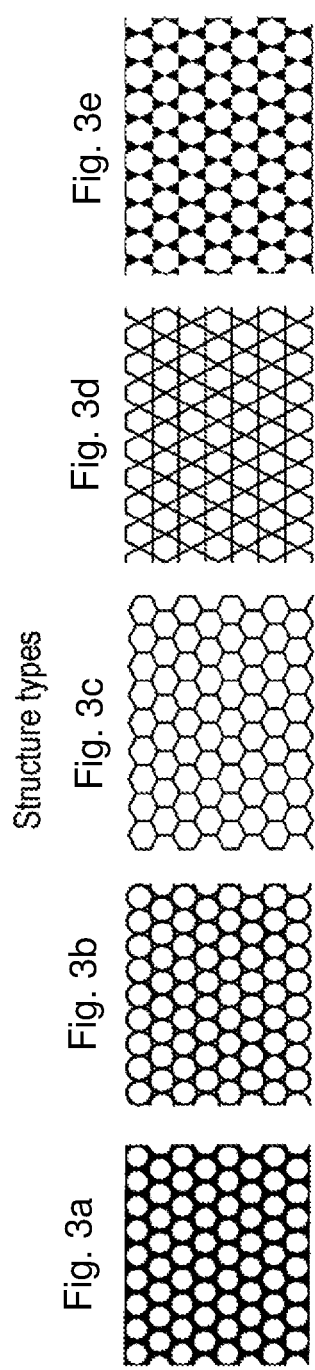
FIGS. 3a-3e show schematics of different structure types for the photonic crystal fibers of the present disclosure, and tabulated information relating to the same.

Here, the low dampings according to the invention of <1 dB/m, in particular <0.3 dB/m, can be achieved by the arrangement shown in FIGS. 3a, 3b, 3c and 3e. FIG. 3a shows an arrangement of hollow bodies in the form of hollow tubes having a substantially round internal cross section and closed packing gaps.

FIG. 3b shows a photonic crystal fiber in which the hollow bodies are in the form of hollow tubes having substantially round internal and external cross sections with open packing gaps.

In FIG. 3c, the photonic crystal fibers have the hollow bodies in the form of dense packings of hexagonal hollow tubes, with the hexagonal hollow tubes being joined via the faces.

Finally, FIG. 3e shows photonic crystal fibers in which the hollow bodies are configured as hexagonal hollow tubes with closed packing gaps.

Figure 3F:
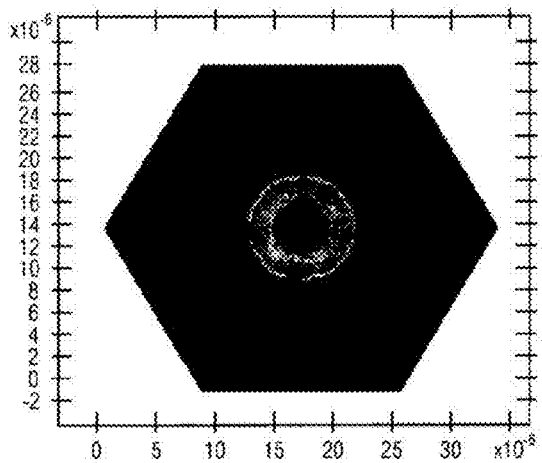
Figure 3G:
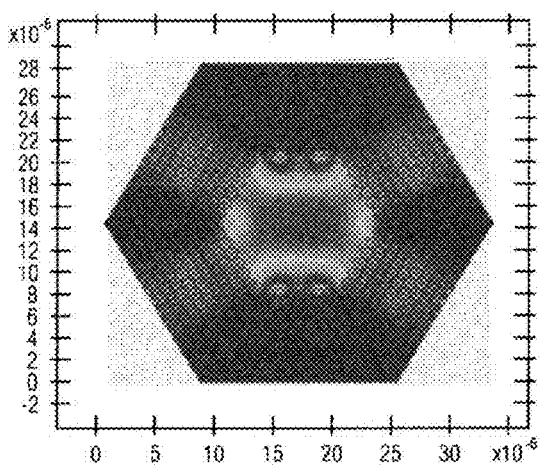
Figure 3H:
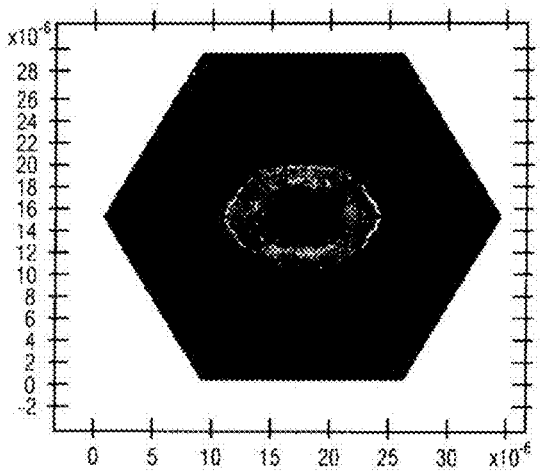

FIGS. 3f-3h show the damping of the fundamental mode in a crystal fiber as a function of the accuracy of the hole structure.

The inventors have discovered that the damping also depends on the degree of preciseness of the hole structure around the hollow core. This applies both to the spacing between two holes (denoted by a) and to the diameter of the holes themselves. It is also critical that the holes be either perfectly round or perfectly hexagonal, depending on how the structure is to look. Oval holes or deviations in the diameters of adjacent holes lead, at a deviation of the structural accuracy of more than 4%, to the damping increasing. When the diameter of the holes is 10 µm, a deviation of 4% means that the holes can have dimensions of 9.6 µm or 10.4 µm. This applies to all parameters (spacing, diameter, change compared to adjacent holes). Above a deviation of 10%, the damping is so high that radiation can no longer be transported effectively through a fiber having a length of more than 50 cm. This is shown in FIG. 3f-3h.

FIG. 3f shows the fundamental mode in the case of good conduction. In comparison thereto, FIG. 3g shows the same mode at a deviation in the geometry of 9.5%. Conduction of a mode is no longer discernible. FIG. 3h shows the mode at a deviation of 4.5%. Even this deviation leads to a non-spherical mode which already suffers significant losses.

FIGS. 3i-3j show the dependence of the conduction of the mode on the refractive index of the base glass for the same structure. When a structure which displays satisfactorily good conduction for a particular value of the refractive index n is determined, even small deviations of about 10% lead to the damping being significantly increased. Thus, for example, it is not possible to apply the design of a PCF for a particular material having a refractive index of $n_1$ to a material having a refractive index of $n_2$. The damping thus depends on the combination of structure and glass type, i.e. refractive index and transmission of the bulk glass in the wavelength range which is of interest. FIG. 3i shows the fundamental mode for a particular geometric arrangement. In FIG. 3j, the refractive index is altered by one compared to FIG. 3i, which leads to complete loss of the conduction behavior for radiation of the same wavelength. This means that when a fiber structure in combination with a glass type has been, for example, optimized for a refractive index n of 2.0-2.7, a refractive index n<2 leads to extremely high emission of the radiation in the structure, so that a light mode is no longer conducted.

The process for producing a fiber according to the invention is described below with reference to FIGS. 4a to 5b by means of the apparatus shown in FIG. 6 for the photonic crystal fibers of the invention.

Figure 4A:
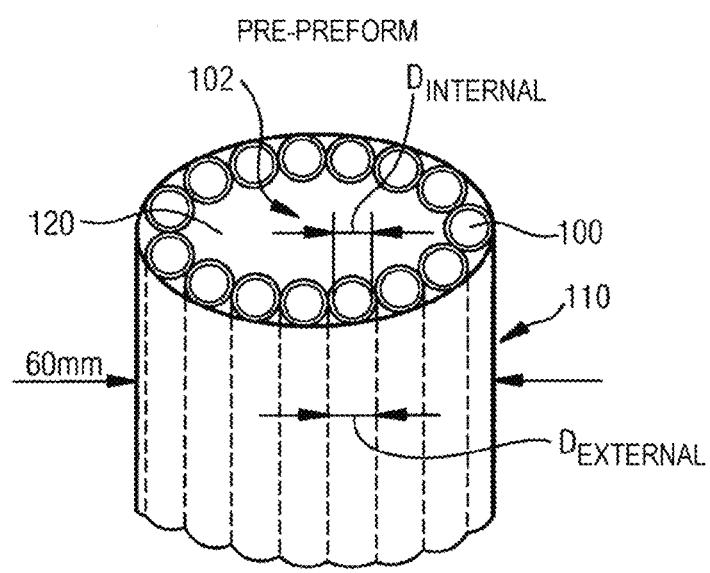
FIG. 4a shows a perspective view of a pre-preform of a microstructured fiber as basis for a first drawing step.

FIG. 4a depicts a pre-preform of a microstructured fiber which is drawn to give a preform in a first step and then drawn in a second drawing step or drawing process to give the desired microstructured fiber.

The pre-preform shown in FIG. 4a, which is the starting point for a microstructured fiber or photonic crystal fiber produced by means of drawing processes, here a two-stage drawing process, consists of a plurality of tubes 100 placed side by side. The tubes are preferably composed of the material, in particular the industrial or optical glass, from which the complete glass fiber is to be produced. According to the invention, the tubes consist of a chalcogenide glass. The external diameter $D_{external}$ of the tubes is, for example, 4 mm and the internal diameter $D_{internal}$ is 3 mm; in the case of solid material, the cylindrical body or the tube has only an external diameter of 4 mm.

If the pre-preform is, as shown, made up of tubes which are arranged side by side and each have an external diameter of 4 mm, the total diameter of the pre-preform is the number of tubes×4 mm. In the case of 15 tubes, the external diameter would be, for example, 60 mm.

Figure 4B:
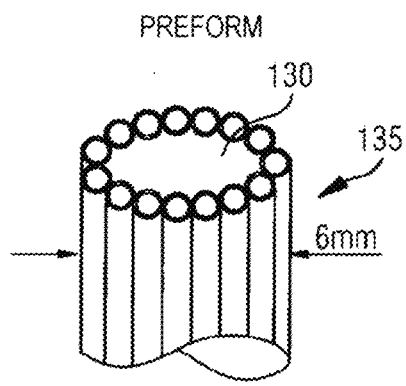
FIG. 4b shows a perspective view of a multifiber rod after carrying out the first drawing step to give the preform for the second drawing step using two heating devices.

If the pre-preform is then drawn in a first drawing step, the result is a perform i.e. a preform having, for example, a 10 times smaller external diameter which is, for example, $D_{external}$ (preform)=6 mm. The preform shown in FIG. 4b is processed further by means of the process of the invention in a second drawing step. For the second drawing step, the preform having an external diameter $D_{external}$ of 6 mm is, for example, inserted in a hollow sheathing tube or cladding in such a way that the sheathing tube completely surrounds the preform. The diameter of the opening of the sheathing tube into which the preform is inserted corresponds approximately to the external diameter of the preform, i.e. about 6 mm. The sheathing tube itself has, for example, a diameter $D_{sheath}$=25 mm. In the second drawing step according to the invention, the preform is drawn together with the sheathing tube which surrounds it. After drawing in the second drawing step, the external diameter of the sheathing tube with fibers located inside is then, for example, 400 µm and the hollow core is more than 20 µm, preferably at least 50 µm, particularly preferably at least 100 µm.

The length $D_L$ of the pre-preform, of the preform and of the fiber can be a meter or more.

In the embodiment shown, some internal tubes located in the middle, for example seven tubes, have been removed so as to give a hollow core 120 which later forms the light-conducting part.

Figure 5:
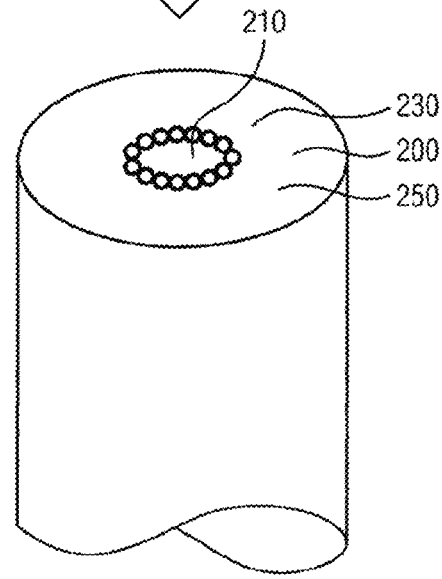
FIG. 5 shows a perspective view of drawn fibers after the second drawing step using two heating devices.

As described above, the pre-preform is drawn down in a first drawing step, for example using a fiber drawing tower which can be equipped with electric heating, as shown in FIG. 4a, to a diameter $D_{new}$ by drawing from 60 mm to, for example, 6 mm. The drawn and narrowed preform 135 is shown in FIG. 4b. As a result of the drawing process, the individual tubes of the body 110 stick together, as shown in FIG. 4a, at the surface along the axis 140 of the body 110, so that a solid rod having a hole structure with a hollow core 130 is formed. The individual tubes 100 are reduced in size to scale in this structured rod. Starting from the narrowed preform 135 as shown in FIG. 4b, the microstructured fiber depicted in FIG. 5 is obtained in a drawing process according to the invention with two heating devices. For this purpose, the preform shown in FIG. 4b is introduced into a sheathing tube, for example having an external diameter of 25 mm, and the second drawing process according to the invention is subsequently carried out.

In the final form of the microstructured fibers shown in figures after the drawing process of the invention using two heating devices, the diameter of the holes 130 is reduced to a diameter of typically from 5 μm to 15 μm. The total diameter of the fiber $D_{fiber}$ after drawing is about 400-1000 μm. To draw a fiber having a diameter of 400-1000 μm, as shown in FIG. 5, starting from, for example, the narrowed preform 135 having a diameter of 6 mm as depicted in FIG. 4b, it is advantageous, as described above, to surround the rod, the "preform", having a diameter of 6 mm obtained in the first drawing step in FIGS. 4a and 4b with a thick-wall sheathing tube or cladding composed of the same material. The diameter of the fiber (not shown) with such a sheathing tube is then 25 mm. Starting out from such a body, a fiber having the desired external diameter of 500 μm can, for example, be drawn with a drawing ratio of 50.

In FIG. 5, the core with the hole structure, i.e. that after drawing, is denoted by the reference numeral 210, the individual tubes by the reference numeral 200 and the hollow core by the reference numeral 230. The sheathing body surrounding the hole structure is denoted by the reference numeral 250. As indicated above, the sheathing body is arranged around the preform 135 after the first drawing process, giving the starting body having a diameter of 25 mm for the fiber drawing process of the invention.

To achieve the shape of the microstructured fibers shown in FIG. 5 and avoid a change in shape or collapse of the individual holes during drawing starting from the preform, the invention provides for the use of two heating devices, a first heating device which heats up the sheathing body 250 and a second heating device which heats up the hollow structure with holes and hollow core for light conduction. The two heating devices act in a single heating zone on the preform which is essentially at the same time or simultaneously. The preform thus acts in a single stage from the outside.

Such a heating apparatus is a conventional heating device for the sheathing body and a heating device for the hollow structure consisting of holes and a hollow conducting core surrounded by the sheathing body by means of IR radiation sources during the drawing process.

Figure 6:
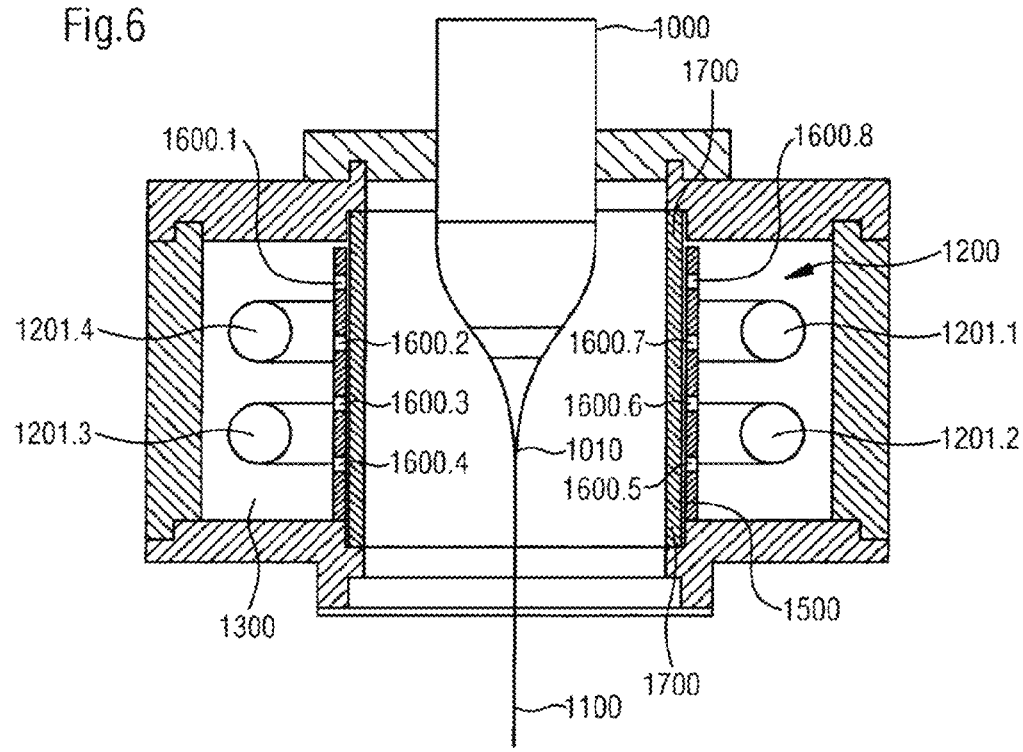
FIG. 6 shows a schematic of an apparatus for drawing a fiber from a preform with two heating devices.

Such an apparatus is depicted in detail in FIG. 6. FIG. 6 depicts the drawing tower 1000 into which the preform with sheathing body, as described above, is introduced. The preform with sheathing body is drawn by means of a drawing process at a drawing temperature which is set with the aid of the heating device according to the invention. The drawn fiber is denoted by 1100.

According to the invention, the apparatus comprises two heating devices. In the present case, only one heating device is configured so as to be active, namely the second heating device 1200 which, in the present embodiment, encompasses a total of four IR radiators 1201.1, 1201.2, 1201.3, 1201.4. The IR radiators employed can be halogen IR radiators having a nominal power of 2000 watts at a voltage of 230 V, which preferably have a color temperature of 2400 K. These IR radiators have, according to Wiens's displacement law, a radiation maximum at a wavelength of 1210 nm. In the drawing process according to the invention, the IR heating device and the material to be drawn are located in an IR radiation cavity 1300. The radiation cavity 1300 ensures that heating of the glass to be drawn occurs partly directly by means of the IR radiation of the IR radiators and partly indirectly by IR radiation which has been reflected or backscattered by the walls, the lid and/or the bottom of the IR radiation cavity. It is particularly advantageous for the proportion of the indirect, i.e. backscattered or reflected, radiation which acts on the glass or glass-ceramic blank to be heated, here the fiber 1100 to be drawn, to be more than 50%, preferably more than 60%, preferably more than 70%, preferably more than 80%, particularly preferably more than 90%, in particular more than 98%. A particular advantage of the use of an IR radiation cavity is that the use of very strongly reflecting and/or backscattering wall, bottom and/or lid materials gives a resonator of high quality which suffers from only small losses and therefore ensures high utilization of energy. When diffusely backscattering wall, lid and/or bottom materials are used, particularly uniform radiation from all volume elements of the cavity at all angles is achieved. Any switching-off effects are thus avoided. As backscattering, i.e. reemitting, wall material, it is possible to use, for example, ground Quarzal plates. Other IR radiators and backscattering materials are also possible as wall, lid and/or bottom materials or coatings of the IR radiation cavity, for example one or more of the following materials:

$Al_2O_3$;
$BaF_2$;
$BaTiO_3$;
$CaF_2$;
$CaTiO_3$;
$MgO.3.5Al_2O_3$;
$MgO$;
$SrF_2$;
$SiO_2$;
$TiO_3$;
$Sr_3$;
$TiO_2$;
Spinel;
Cordierite;
Cordierite-sintered glass-ceramic.

The IR radiators have a color temperature which is preferably >1500 K, particularly preferably >2000 K, very particularly preferably >2400 K, in particular >2700 K, especially preferably >3000 K.

To avoid overheating of the IR radiators, these are advantageously cooled, in particular air- or water-cooled (not shown).

Between the material to be drawn, here the fiber 1100 to be drawn, and the IR radiators 1201.1, 1201.2, 1201.3, 1201.4, there is, in the embodiment depicted, a metal sheath 1500 having openings 1600.1, 1600.2, 1600.3, 1600.4, 1600.5, 1600.6, 1600.7, 1600.8. The metal sheath 1500 with openings is a radiation interference body which is inserted between the IR heating elements and the fiber 1100 to be drawn. Under the action of the IR radiation, the metal sheath 1500 or the radiation interference body itself heats up to a particular temperature and thus itself becomes a heating element, in the present case the first heating element, which gives off heat, convectively and by radiation, in the direction of the fiber 1100 to be drawn. Part of the radiation of the IR heating elements goes through the openings, e.g. axial slits on the circumference of the hollow body, to the preform or to the fiber to be drawn and from there into the interior of the preform, i.e. into the hollow structure. This IR heating is referred to as second heating element. First and second heating element together heat up the glass body to be drawn. Skillful selection of the material of the metal body 1500 and the selected power of the IR heating elements allows the temperature of the cylinder to be set to any value below the IR radiation temperature, in the present case to a temperature above, preferably from 10 K to 100 K above, the softening temperature $T_{EW}$ of the material to be drawn. The combination of the two heating methods—convective heating by means of the first heating element and IR heating by means of the second heating element—makes it possible to achieve largely uniform heating of the body to be drawn, here the preform for the fiber to be drawn.

If changing the power of the IR heating elements is not sufficient for influencing the heat power of the first heating element in the form of the metal sheath 1500, active cooling or supplementary heating (not shown) can be provided on the metal sheath 1500.

In the embodiment in FIG. 6, a fused silica tube 1700 is inserted within the metal sheath 1500 having openings 1600.1, 1600.2, 1600.3, 1600.4, 1600.5, 1600.6, 1600.7, 1600.8. The fused silica tube 1700 is highly transparent with a transmission of more than 80%, in particular more than 90%, for wavelengths of from 200 nm to 4000 nm, i.e. from the UV range far into the IR range. The drawing of the fiber is carried out within the fused silica tube 1700 in a largely hermetically sealed volume. This has the advantage that no convection occurs and contamination is also largely avoided. In addition, the temperature homogeneity can be adjusted by doping or coating of this tube.

WORKING EXAMPLE

A working example of the production of photonic crystal fibers from a chalcogenide glass is described below.

As chalcogenide glass, the chalcogenide glass IG6 from SCHOTT AG was drawn to form a photonic crystal fiber. The chalcogenide glass IG6 is an $As_{40}Se_{60}$ glass which is free of germanium and has a minimum absorption at 12.5 µm. The refractive index at a wavelength of 12.3 µm is n=2.7721 at 20° C.

Tubes having external diameters of 31 mm and internal diameters of 26 mm and rods having an external diameter of 31 mm are firstly produced from a glass block consisting of the highly IR-transparent glass IG6 from SCHOTT AG by mechanical processing.

These starting tubes are drawn down to give preformed tubes having an external diameter of 3.1 mm and an internal diameter of 2.6 mm by further drawing in a conventional drawing tower.

Preforms having a hexagonal cross section and a diameter of 50 mm and a length of up to 1 m or longer can now be produced from the 3.1 mm thick tubes by simple assembly. Such a preform contains 15 hexagonal rings of tubes plus one tube in the center of the preform. The innermost 5 rings which are located precisely around the center of the preform including the middle tube in the center of the preform itself are taken out without being replaced. This hollow space forms the future light-conducting hollow core which is denoted by 5 in FIGS. 2a-2e.

The preform is subsequently drawn down to a diameter of 10.5 mm in a first drawing step in a fiber drawing tower with conventional electric heating. The glass temperature necessary for drawing is in the case of the glass material IG6 from SCHOTT AG, depending on the diameter of the preform to be drawn, from about 20 K to 60 K above the softening point (viscosity n=$10^{7.6}$ dPas), so that when using a conventional electric heating apparatus, drawing can be carried out at an oven temperature of from about 200° C. to 300° C. in order to achieve the necessary glass temperature of from 200° C. to 240° C. As a result of the specifically matched drawing process, the individual tubes stick together at the surface along the axis of the preform, so that a solid rod having a hole structure is formed. The geometry of the individual tubes in this structured rod has been made smaller to scale. However, the hole diameters achieved here are still so large that collapse as a result of the surface tension does not occur.

To achieve the desired hole size of 11.28 µm in diameter in the final fiber, where the total diameter of the fiber should be 500 µm, an appropriate drawing ratio (ratio of preform diameter to fiber diameter) has to be set. If the structured preform having a diameter of 10.5 mm were to be narrowed by the drawing ratio of 30 necessary in the present example, a fiber having a diameter of 350 µm would be obtained. Such an individual fiber consisting only of extremely thin-walled tubes without a strong outer fiber protective layer represents a great challenge both for subsequent handling and also for the drawing process itself. Furthermore, such a fiber does not have a diameter of 500 µm. In order to obtain such a desired fiber, the structured rod from which the final fiber is drawn has to have a diameter of 15 mm. This is achieved by sheathing of the 10.5 mm rod obtained in the first drawing step with a sheathing tube which is composed of the same material and whose internal diameter is matched exactly.

The final assembled preform obtained in this way is then drawn down to a diameter of 500 µm in a second drawing step, as described above, at an oven temperature of about 240° C.

The most important consequence of the hybrid heating technology as described above is that the total temperature level of the preform in the drawing process can be lowered because it is necessary for only that amount of energy as is required locally in order to attain the drawing temperature exactly to be introduced there. The drawing process can therefore be carried out at the highest possible viscosity. This remains at such a high level that the surface tension in the holes of the hollow structure can be kept so low that the structure does not collapse. Owing to smaller temperature fluctuations, it is nevertheless possible to obtain an over proportional reduction in the size of the hollow structure without any hole collapsing completely. This phenomenon can be covered in a targeted manner by application of an internal superatmospheric pressure in the region of a few millibars to the holes of the hollow structure. The magnitude of the pressure has to precisely match the absolute value of the surface tension which allows the holes to collapse. However, this is, as already mentioned above, possible only when the structure has sufficient intrinsic stability for none of the holes to collapse completely on its own. If this happens, it is not possible to achieve stable restoration of the total structure and a reliable to-scale reduction in the size of the fiber because of instabilities and self-reinforcing physical effects.

In the working example described, an 8-14 µm pyrometer is employed for determining the temperature of the preform in the drawing process. For this purpose, there has to be optical access from the outside into the interior of the heating apparatus as far as the surface of the preform. If a temperature in the interior of the preform is to be determined, for example of the surface of the internal structure, a pyrometer must be used having a wavelength at which the glass is transparent up to the measuring point.

These measured temperatures can then be utilized for regulating the temperature by setting of the power of the IR heating element.

Using the above-described process, a fiber having an external diameter 500 µm composed of the glass IG6 from SCHOTT AG could be drawn in the down-draw process from a 200 mm long sheathing tube having an external diameter of 15 mm and a structured rod which has a diameter of 10.5 mm and has been fitted exactly into the sheathing tube, with the hollow structure in the interior of the preform being retained in the fiber. A to-scale reduction in size could likewise be achieved by application of an additional pressure at the upper end of the structured rod.

Immediately after the actual drawing process, the fiber was coated with a polymer layer to increase the strength. For this purpose, the final fiber was conveyed through a coating die which coated the fiber with a liquid 50 µm thick acrylate layer. This is followed immediately by UV irradiation of the UV-curable acrylate, for which an annular UV source placed around the fiber was utilized. The length of the UV section has to be selected so that, depending on the drawing speed of the fiber, the residence time in the UV irradiation zone is sufficiently high for the acrylate to be able to cure completely. The fiber is subsequently wound up onto a suitable spool having a diameter of, for example, 400 mm.

The invention thus for the first time provides a photonic crystal fiber by means of which it is possible to transmit electromagnetic radiation in the IR wavelength range from 5 µm to 15 µm largely without losses, i.e. with damping values of <2 dB/m, preferably <1 dB/m, in particular <0.1 dB/m. This makes it possible to transmit high IR powers without the glass fiber heating up excessively and thereby being destroyed. For this reason, the photonic crystal fiber is particularly suitable for use in $CO_2$ laser devices. Apart from the photonic crystal fiber, a process for producing this fiber from a preform largely without a change in shape and without collapse of the microstructure in a drawing process is provided.

What is claimed is:

1. A photonic crystal fiber, for the transmission of electromagnetic radiation in the IR wavelength range >1 µm, comprising:
   a hollow core having a diameter D and a plurality of hollow bodies that are arranged around the hollow core, wherein the hollow core comprises a chalcogenide glass,
   wherein the hollow bodies are arranged so that diameter D is greater than 20 µm, and
   wherein the hollow bodies have a cross-sectional diameter d, and are spaced apart at a distance a, so that a deviation of the spacing a and/or diameter d is less than 10%,
   wherein the spacing a is such that a ratio a/λ is greater than or equal to 1, wherein λ is the wavelength of the electromagnetic radiation that is to be transmitted,
   wherein the diameter d is in the range from 0.90 a to 0.98 a, and
   wherein the photonic crystal fiber exhibits a damping for the transmission of electromagnetic radiation that is <2 dB/m.

2. The photonic crystal fiber as claimed in claim 1, wherein the hollow bodies arranged around the hollow core are arranged in structure rings around the hollow core.

3. The photonic crystal fiber as claimed in claim 2, wherein there are at least four of the structure rings of hollow bodies arranged around the hollow core.

4. The photonic crystal fiber as claimed in claim 1, wherein the diameter d is in the range from 5µm to 20µm.

5. The photonic crystal fiber as claimed in claim 4, wherein the hollow bodies have a circular or hexagonal cross section.

6. The photonic crystal fiber as claimed in claim 1, wherein the refractive index of the chalcogenide glass is for a wavelength of from 1 µm to 20 µm between of 1.8 and 3.

7. The photonic crystal fiber as claimed in claim 1, wherein the photonic crystal fiber is a mode-maintaining crystal fiber.

8. The photonic crystal fiber as claimed in claim 1, wherein the hollow bodies are hollow tubes having substantially round internal and external cross sections with open packing gaps.

9. The photonic crystal fiber as claimed in claim 1, wherein the hollow bodies form dense packings of hexagonal hollow tubes and the hexagonal hollow tubes are joined via their faces.

10. The photonic crystal fiber as claimed in claim 1, wherein the light-conducting core has a cross section that is not round.

11. The photonic crystal fiber as claimed in claim 1, wherein the chalcogenide glass comprises at least one of the following elements:
   Germanium (Ge)
   Arsenic (As)
   Selenium (Se)
   Tellurium (Te)
   Antimony (Sb).

12. A process for producing a photonic crystal fiber as claimed in claim 1, which comprises the steps of:
   producing a pre-preform of hollow bodies, where the pre-preform is hexagonal in cross section;
   removing the hollow bodies in the middle of the pre-preform to make the light-conducting hollow core,
   drawing the pre-preform down to a first diameter in a first drawing step with heating to a temperature of from 20 K to 60 K above the softening point of the glass material, giving a preform in the form of a solid, structured rod having a light-conducting core;
   sheathing the preform obtained in the first drawing step with a sheathing tube, wherein the sheathing tube is composed of the same material as the preform;
   drawing-down the sheathed preform by a ratio in the range from 10 to 200 in a second drawing step, giving the photonic crystal fiber having a diameter of the light-conducting hollow core of at least 20 µm, wherein the outer structure of the sheathed preform is heated to drawing temperature by means of a first heating element and the light-conducting hollow core of the preform is heated to drawing temperature by means of a second heating element.

13. The process as claimed in claim 12, wherein the temperature of the preform is continually measured by means of a temperature measuring device during the drawing process and the power of the first and second heating device is set in such a way that a predetermined drawing temperature is always maintained.

14. The process as claimed in claim 12, wherein after the hollow body has been taken out from the middle of the pre-preform to give the light-conducting core, in particular the hollow core, a support body, in particular a thin-walled support body, is inserted to stabilize the hollow core.

15. The process as claimed in claim 12, wherein the photonic crystal fiber comprises an arrangement of the hollow bodies in a structure having a spacing a of the hollow bodies and/or a cross section of the hollow bodies and the deviation of the spacing a and/or of the cross section of the hollow bodies for different hollow bodies is less than 10%.

16. A laser device for generating electromagnetic radiation in the IR wavelength range >1 µm, comprising at least one photonic crystal fiber as claimed in claim 1.

17. The photonic crystal fiber as claimed in claim 1, wherein the photonic crystal fiber exhibits a damping for the transmission of electromagnetic radiation that is <0.5 dB/m.

18. The photonic crystal fiber as claimed in claim 17, wherein there are six or more of the structure rings.

* * * * *